United States Patent

Aebischer et al.

[11] Patent Number: 6,033,696
[45] Date of Patent: Mar. 7, 2000

[54] COATED SNACK FOOD PRODUCT

[75] Inventors: Jürg Aebischer, Niederscherli; Roman Deutsch, Lutry; Osvaldo Geromini, Magnenette; Ernst Heck, Vufflens-la-Ville; Niklaus Meister, Grosshocohstetten; Maximiliano Poblete, Pully, all of Switzerland

[73] Assignee: Nestec S.A., Vevey, Switzerland

[21] Appl. No.: 09/165,137

[22] Filed: Oct. 5, 1998

[30] Foreign Application Priority Data

Oct. 7, 1997 [EP] European Pat. Off. ............. 97203092

[51] Int. Cl.⁷ .................................. A23P 1/08; A23P 1/14
[52] U.S. Cl. ............................. 426/94; 426/594; 426/93; 426/560; 426/303
[58] Field of Search ............................. 426/94, 594, 93, 426/560, 303

[56] References Cited

U.S. PATENT DOCUMENTS

| | | | |
|---|---|---|---|
| 4,497,840 | 2/1985 | Gould et al. | 426/560 |
| 4,568,557 | 2/1986 | Becker et al. | 426/618 |
| 4,673,578 | 6/1987 | Becker et al. | 426/93 |
| 4,820,470 | 4/1989 | Ferrero | 264/555 |
| 4,837,042 | 6/1989 | Vajda et al. | 426/615 |
| 4,851,247 | 7/1989 | Greenhouse et al. | 426/250 |
| 5,126,150 | 6/1992 | Piatt et al. | 426/94 |
| 5,250,308 | 10/1993 | Alexander et al. | 426/94 |
| 5,275,831 | 1/1994 | Smith et al. | 426/93 |
| 5,342,635 | 8/1994 | Schwab et al. | 426/241 |
| 5,364,653 | 11/1994 | Nakayama | 426/660 |
| 5,451,419 | 9/1995 | Schwab et al. | 426/564 |

OTHER PUBLICATIONS

Abstract for WO 89 04121 A (Schaaf Heinz Ohg) May 18, 1989.
Abstract for DE 2712311; Vassan Hoeyrymylly OY Oct. 27, 1997.
Abstract of JP 1174322A; QP Corp.; Jul. 10, 1989.
Abstract for WO 9317592 A; Schaaf Technologie Gmbh Sep. 15, 1993.

*Primary Examiner*—David Lacey
*Assistant Examiner*—Philip DuBois
*Attorney, Agent, or Firm*—Pennie & Edmonds LLP

[57] ABSTRACT

A finger-food snack containing from about 8 to 16% of whole milk solids and being in the form of a body, obtainable by cooking-extrusion-expansion of a cereal based mixture, that is coated with a sugar based slurry.

8 Claims, No Drawings

COATED SNACK FOOD PRODUCT

TECHNICAL FIELD

The present invention relates to a snack which can be eaten with the fingers by toddlers and to a process for manufacturing a finger-food snack of this kind.

BACKGROUND ART

U.S. Pat. No. 4,650,685 (Persson et al.) discloses a biscuit comprising agglomerated granules of a cooked-extruded base coated with a binder, the base comprising from 40 to 80 parts by weight of cereal flour, up to 20 parts sucrose and from 0.5 to 3 parts of oil or fat, and the binder comprising from 8 to 30 parts by weight of sucrose and/or mixtures of glucose and its polymers.

Japanese Patent Application 01-174,322 (QP CORP) discloses a drop or cookie for babies and infants obtained by baking a dough consisting of starch, saccharides and milk, and containing a powder of fruit juice but no egg material.

U.S. Pat. No. 4,044,159 (Lutz) discloses a ready-to-eat expanded cereal product in the form of thin flakes, suitable for the feeding of junior-age infants, obtained by cooking-extruding-expanding a moist blend comprising cereal grain, slicing the expanded rope of cooked-extruded blend into flakes and drying the flakes.

PCT Application WO89/04121 (HEINZ SCHAAF OHG) discloses a process for manufacturing cereals, especially for babies, by cooking-extruding a mixture of cereal material, vegetable and/or fruits with a partial amount of sugar and milk, cutting the expanded rope of cooked-extruded mixture into pieces having a large surface, spraying an aqueous suspension of sugar and milk onto the just cut, hot and moist pieces, coating the moistened pieces with a remaining part of components in powder form and drying the coated pieces.

PCT Application WO93/17592 (SCHAAF TECHNOLOGIES GMBH) discloses a process and an apparatus for cooking-extruding-expanding vegetable and/or fruit containing cereals, in which expansion is carried out in a large expansion zone provided for after an extrusion zone and before a cutting zone.

SUMMARY OF THE INVENTION

The present invention provides a new type of finger-food snack which can be eaten by toddlers. This snack is obtainable by cooking-extrusion-expansion and coating, and is rather large and attractive in shape, color and taste while being dietetically adequate. A process for manufacturing such a snack is also disclosed.

The present snack comprises, in percent by weight of the snack, from about 8 to 16% of whole milk solids, from about 1 to 8% of dietary fibers and from about 1 to 2.5% of water. The snack is a coated body obtainable by cooking-extrusion-expansion of a mixture comprising, in percent by weight of the mixture, from about 8 to 16% of whole milk powder, from about 3 to 5% of vegetable fat, from about 35 to 50% of corn semolina, up to 30% of other cereal flour, up to 10% of cereal bran, from about 20 to 30% of starch and added water up to a water content of from about 13 to 18%. The body is coated by a coating obtainable by spraying onto the body and drying a slurry comprising, in percent by weight of the slurry, from about 30 to 60% of a fruit or vegetable puree or concentrate, from about 10 to 30% of sugar, from about 10 to 25% of whole milk powder and added water up to a water content of from about 20 to 30%.

The present process for manufacturing the snack comprises manufacturing a body by cooking-extruding-expanding at a temperature of at about 135 to 150° C. under a pressure of about 130 to 160 bar a mixture comprising, in percent by weight of the mixture, from about 8 to 16% of whole milk powder, from about 3 to 5% of vegetable fat, from about 35 to 50% of corn semolina, up to 30% of other cereal flour, up to 10% of cereal bran, from about 20 to 30% of starch and added water up to a water content of from about 13 to 18%, coating the body by spraying thereon a slurry comprising, in percent by weight of the slurry, from about 30 to 60% of a fruit or vegetable puree or concentrate, from about 10 to 30% of sugar, from about 10 to 25% of whole milk powder and added water up to a water content of from about 20 to 30%, and drying the coated body down to a residual water content of from about 1 to 2.5%.

DETAILED DESCRIPTION OF THE INVENTION

In the present context, the expression "being dietetically adequate" may be understood as designating a snack based on cereal semolina and/or flour especially comprising, in percent by weight, from about 8 to 16% of whole milk solids and from about 1 to 8% of dietary fibers.

In addition to the dietary fibers and residual water, the snack may generally comprise, in percent by weight of the snack, from about 6 to 10% of protein, from about 60 to 80% of available carbohydrates and from about 6 to 9% of fat.

The expression "other cereal" is used to mean a cereal which is other than corn.

It has surprisingly been found that problems encountered especially in the matter of expansion, texture and color of the snack were best solved with the snack composition and the process described above.

It has especially been found that the milk solids may better be incorporated into the snack in two parts, a first part being incorporated into the body and a second part being incorporated into the coating. In this way, it is possible to obtain an expanded snack which has a smooth, crunchy but not hard texture and which has a rather bright color. Preferably, out of 100% by weight milk solids in the snack, about 55 to 65% belong to the body and about 35 to 45% belong to the coating.

The mixture to be treated by the cooking-extrusion-expansion process thus comprises, in percent by weight of the mixture, from about 8 to 16% of whole milk powder. It has namely been found that more than 16% of whole milk powder in the mixture result in texture that is too hard and a color that is too dark.

The mixture further comprises from about 3 to 5% of vegetable fat which acts as a lubricating agent in the cooking-extrusion process and which preferably is a well keeping fat having a rather high level of oleic acid, such as sunflower oil.

The mixture also comprises from about 35 to 50% of corn semolina which is necessary for obtaining good expansion. This may be illustrated by a preferred expansion degree of the body of from about 2 to about 5.

The mixture also comprises up to 30% of other cereal flour and possibly up to 10% of cereal bran. The so called other cereal may be wheat or oat, for example. The cereal bran may be wheat bran, corn bran and/or oat bran. Depending on its extraction grade, a contribution to the final content of the snack in dietary fiber can also be made by a flour, especially an oat flour or whole wheat flour, and not only if at all by a bran.

The mixture also comprises from about 20 to 30% of starch which also is necessary for obtaining a good expansion. A suitable starch may be a cereal starch such as wheat or corn starch, but it is preferably a high amylopectin starch such as waxy corn starch.

The mixture also comprises added water up to a water content of from about 13 to 18%. Such a water content is adequate for obtaining a correct expansion after cooking-extrusion of the mixture.

The mixture may further comprise up to about 0.5% of a raising agent, typically of a food grade chemical compound which is able to release carbon dioxide in contact with water, with calcium carbonate being preferred.

Finally, the mixture may also further comprise up to about 1% of an antioxidant such as sodium biphosphate anhydrate.

The slurry to be sprayed onto the body thus comprises, in percent by weight of the slurry, from about 30 to 60% of a fruit or vegetable puree or concentrate. The fruit or vegetable may be banana, orange, apple and/or carrots.

The slurry also comprises from about 10 to 30% of sugar. The sugar may be sucrose, fructose and/or a product of enzymatical saccharification of starch.

The slurry also comprises from about 10 to 25% of whole milk powder. It has namely been found that more than 25% whole milk powder excessively enhances the viscosity of the slurry.

The slurry finally comprises added water up to a water content of from about 20 to 30%. Such a water content together with a preferred temperature of the slurry of from about 45 to 55° C. have been found to be especially adequate for manipulating the slurry while avoiding both microbial contamination and Maillard reaction.

For carrying out the process according to the present invention, a body is thus manufactured by cooking-extruding-expanding at a temperature of about 135 to 150° C. under a pressure of about 130 to 160 bar a mixture having the composition disclosed above. For carrying out this first manufacturing step, any traditional extruder may be used, with a twin screw extruder being preferred. This extruder preferably should comprise an extrusion die provided with at least one rather large extrusion opening having the shape of a fruit, a vegetable or other familiar item.

Preferably, the body is cooked-extruded-expanded to an expansion degree of from about 2 to 5. Water is lost in form of steam escaping the mixture during expansion so that the body may have a water content of between about 4 to 8% after the cooking-extrusion-expansion step.

In order to be able to reach a very low moisture of the end product, it is advisable to provide for an intermediate drying step of the body at this stage, before coating the body with the slurry.

Such an intermediate drying step may be carried out on a belt drier with hot air down to a residual water content of less than about 1%.

The step of coating the body by spraying thereon a slurry having the composition disclosed above may be carried out in a cylindrical tumbler rotating around its generally horizontal axis and being provided inside with spraying nozzles. Preferably located in an upper part of the cylindrical internal space defined by the tumbler wall, such nozzles may spray the slurry downwards onto the tumbled bodies.

Then, the just coated body is dried down to a residual water content of from about 1 to 2.5% by weight. This drying step may be also be carried out on a belt drier with hot air.

The snack thus obtained may be conditioned in a packing providing for its protection against humidity, such as a packing made of a film with aluminum foil.

EXAMPLE

The following example is given as illustration of an embodiment of the snack and an embodiment of the process for its manufacture according to the present invention. The parts and percentages are by weight.

For manufacturing a finger-food snack having a banana shape and taste, which is to be eaten by toddlers, a mixture was first prepared which had the following composition, in percent by weight of the mixture:

| Corn semolina | 40.10% |
|---|---|
| Waxy corn starch | 23.43% |
| Whole wheat flour | 10.13% |
| Oat flour | 7.59% |
| Whole milk powder (25% fat) | 11.20% |
| Sodium biphosphate anhydrate | 0.95% |
| Calcium carbonate E 170 | 0.30% |
| Sunflower oil | 3.00 |
| Added Water | 3.30% |

For preparing the mixture, the first seven ingredients (i.e. the powders) were first mixed together to obtain a dry mix. The dry mix, oil and added water were then mixed together in the extruder. The mixture obtained in this way was cooked-extruded-expanded with the aid of a BC-72 type CLEXTRAL twin screw extruder having a screw diameter of 88 mm and a total processing length of 900 mm (10.2× screw diameter).

Cooking-extrusion was carried out at 144° C. under 139 bar, the two intermeshing screws rotating at 247 rpm. The mixture cooked in this way was extruded through a die having one banana shaped outlet opening or orifice. More precisely the die opening had a curved shape about 21.5 mm in length, about 3 mm in mean width and about 10 mm in mean radius.

The mixture was thus extended into ambient air and immediately cut with a two blade cutter rotating adjacent to the opening at 3822 RPM.

The banana shaped bodies obtained in this way expanded after cutting to an expansion degree of about 3, that means they were about 48 mm±4 mm in length and of about 14 mm±2 mm in diameter. They had a water content of about 5.5%.

The banana shaped bodies were then dried with hot air on a belt dryer to a residual water content of 0.8% before coating.

Meanwhile a slurry had been prepared which had the following composition, in percent by weight of the slurry:

| Banana juice concentrate | 39.33% |
|---|---|
| Apple juice concentrate | 13.01% |
| Whole milk powder (25% fat) | 15.22% |
| Fructose | 25.02% |
| Added Water | 7.42% |

For preparing the slurry, the components were mixed together in a double walled tank while being heated to about 50° C.

In a tumbler 80 cm in diameter and 150 cm in length, the slurry was sprayed while still hot onto the tumbling bodies by means of 7 spray nozzles, at a rate of 125 kg of slurry for 250 kg of bodies per hour.

The freshly coated bodies were then dried with hot air on a belt dryer to a residual water content of 1.8%.

The snacks thus obtained had a dietary fiber content of 2%. They had the shape, color and taste of banana, a smooth and crunchy texture, and they could be eaten with the fingers by toddlers.

What is claimed is:

1. A snack comprising, in percent by weight of the snack, from about 8 to 16% of whole milk solids, from about 1 to 8% of dietary fibers and from about 1 to 2.5% of water, in the form of a coated body, with the body being obtainable by cooking-extrusion-expansion of a mixture comprising, in percent by weight of the mixture, from about 8 to 16% of whole milk powder, from about 3 to 5% of vegetable fat, from about 35 to 50% of corn semolina, up to 30% of other cereal flour, up to 10% of cereal bran, from about 20 to 30% of starch and added water up to a water content of from about 13 to 18%, the body being coated by a coating obtainable by spraying onto the body and drying a slurry comprising, in percent by weight of the slurry, from about 30 to 60% of a fruit or vegetable puree or concentrate, from about 10 to 30% of sugar, from about 10 to 25% of whole milk powder and added water up to a water content of from about 20 to 30%, wherein about 55 to 65% of the milk solids are present in the body and 35 to 45% by weight are present in the coating.

2. The snack according to claim 1, in which the coated body comprises, in percent by weight of dry matter of the coated body, from about 60 to 80% dry matter belonging to the body and from about 20 to 40% dry matter belonging to the coating.

3. The snack according to claim 1, having the shape of a fruit, a vegetable.

4. The snack according to claim 1, wherein said fruit or vegetable puree or concentrate comprises banana puree or concentrate and said snack having the the shape and taste of a banana.

5. A snack comprising, in percent by weight of the snack, from about 8 to 16% of whole milk solids, from about 1 to 8% of dietary fibers and from about 1 to 2.5% of water, in the form of a coated body, with the body being a cooked-extruded-expanded mixture comprising, in percent by weight of the mixture, from about 8 to 16% of whole milk powder, from about 3 to 5% of vegetable fat, from about 35 to 50% of corn semolina, up to 30% of other cereal flour, up to 10% of cereal bran, from about 20 to 30% of starch and added water up to a water content of from about 13 to 18%, and the body being coated by a coating comprising, in percent by weight, from about 30 to 60% of a fruit or vegetable puree or concentrate, from about 10 to 30% of sugar, and from about 10 to 25% of whole milk powder, wherein about 55 to 65% of the milk solids are present in the body and 35 to 45% by weight are present in the coating.

6. The snack according to claim 5, in which the coated body comprises, in percent by weight of dry matter of the coated body, from about 60 to 80% dry matter belonging to the body and from about 20 to 40% dry matter belonging to the coating.

7. The snack according to claim 5, having the shape of a fruit, a vegetable.

8. The snack according to claim 5, wherein said fruit or vegetable puree or concentrate comprises banana puree or concentrate and said snack having the the shape and taste of a banana.

* * * * *